(12) United States Patent
Poniatowski et al.

(10) Patent No.: US 6,736,904 B2
(45) Date of Patent: May 18, 2004

(54) METHOD AND APPARATUS FOR THE GENERATION OF ULTRASONIC ENERGY FIELDS WITHIN CIRCULAR STRUCTURES CONTAINING A LIQUID

(75) Inventors: John Eugene Poniatowski, Annandale, VA (US); Susan Elizabeth Poniatowski, Westford, MA (US); John William Walkinshaw, Westford, MA (US)

(73) Assignee: Paper Quality Management Associates, Westford, MA (US)

( * ) Notice: Subject to any disclaimer, the term of this patent is extended or adjusted under 35 U.S.C. 154(b) by 230 days.

(21) Appl. No.: 09/798,677

(22) Filed: Mar. 2, 2001

(65) Prior Publication Data
US 2002/0121285 A1 Sep. 5, 2002

(51) Int. Cl.$^7$ ............................. B08B 7/02; B08B 7/00
(52) U.S. Cl. ............................. 134/1; 134/186; 162/50
(58) Field of Search ...................... 181/142; 134/1, 134/16, 17, 184, 18; 162/4, 9, 50

(56) References Cited

U.S. PATENT DOCUMENTS

| | | | |
|---|---|---|---|
| 3,420,454 A | 1/1969 | Brown, Jr .................. 241/46 |
| 3,946,829 A | 3/1976 | Mori et al. ................. 181/142 |
| 4,546,459 A | 10/1985 | Congdon .................... 367/155 |
| 4,872,953 A | 10/1989 | Smith ........................ 162/261 |
| 5,413,675 A | 5/1995 | Ikonomou et al. ............. 162/5 |
| 5,574,538 A | 11/1996 | Takahashi et al. ............ 399/71 |
| 5,685,952 A | 11/1997 | Owen ......................... 162/4 |
| 5,912,182 A | 6/1999 | Coakley et al. ............. 436/174 |
| 5,979,664 A | 11/1999 | Brodeur ..................... 209/155 |
| 6,019,852 A | 2/2000 | Pedziwiatr et al. ............ 134/1 |

FOREIGN PATENT DOCUMENTS

JP          01101576 A       4/1989

OTHER PUBLICATIONS

Leslie L. Tural et al. "Ultrasonic deinking of wastepaper", *Tappi Jan. 1978*, vol. 61 (2) pp. 31–34.
Leslie L. Tural et al. "Ultrasonic deinking of wastepaper A pilot–plant study", *Tappi Jan. 1979*, vol. 62 (1) pp. 45–47.
Atochen Sensors, INC Technical Notes (1987).
M. K. Ramasubramanian et al. "Focused High Frequency Ultrasonic Removal of Xerographic Toner From Paper Surfaces" *2000 Tappi Recycling Symposium vol. 1*, Mar. 5–8, 2000 Hyatt. Crystal City Washington, D.C.

*Primary Examiner*—Alexander Markoff
(74) *Attorney, Agent, or Firm*—Lahive & Cockfield, LLP

(57) ABSTRACT

A resonant chamber that produces an ultrasonic energy field about a central axis of the chamber to separate contrary matter from a working material. The resonant chamber has a circular cross section and utilizes a series of transducer elements to generate an ultrasonic transverse wave disposed about the internal longitudinal axis of the chamber. In addition, a driver circuit is provided that is able to efficiently excite the transducer elements to generate the ultrasonic transverse wave with a minimum of heat dissipation and power loss.

35 Claims, 6 Drawing Sheets

METHOD AND APPARATUS FOR THE GENERATION OF ULTRASONIC ENERGY FIELDS WITHIN CIRCULAR STRUCTURES CONTAINING A LIQUID

TECHNICAL FIELD

The present invention generally relates to a method and a system for forming an energy field in a resonant chamber, and more particularly relates to a system and a method for separating contrary matter from a working material using ultrasonic energy.

BACKGROUND OF THE INVENTION

The popularity of electrophotographic imaging compounds, such as dry toner used in laser and xerographic imaging devices, constitutes a growing concern in the area of waste paper recycling. Traditionally, documents have been imaged or printed using water or oil based inks, which are adequately removed using conventional deinking techniques. One such conventional deinking technique requires that the waste paper be mechanically pulped and placed in contact with an aqueous medium containing a surfactant. The oil and water based inks are separated from the pulp fibers as a result of the mechanical pulping and the action of the surfactant. The dispersed ink is then removed from the paper pulp by a washing process and/or a floatation process.

Conventional deinking processes have had little success when the waste paper is contaminated with an electrophotographic imaging compound. A factor contributing to the limited success of conventional deinking processes, is the fact that electrophotographic imaging compounds, such as dry toners, are attached to the imaging medium using heat or the combination of heat and pressure. The use of heat causes the electrophotographic imaging particles to fuse to the paper surface and to one another. Conventional deinking processes attempt to overcome this fusion problem by increasing the required time for pulping, by increasing the water temperature required in the pulper, and by raising the pH level of the liquid in the pulping apparatus.

The conventional deinking processes are costly in terms of energy, material, and various environmental factors, such as waste water treatment, personnel training, regulatory affairs, and the like. The burden of recycling waste paper contaminated with an electrophotographic imaging compound, such as dry toner, using conventional deinking processes, results in a low grade paper product that is costly to produce.

SUMMARY OF THE INVENTION

The present invention addresses the above-described limitations of the conventional processes for deinking waste paper contaminated with electrophotographic imaging compounds. The present invention provides an approach to reduce the dependency on processing chemicals, and to reduce the overall cost of processing waste paper contaminated with an electrophotographic imaging compound. An additional advantage of the present invention is that the recycled paper stock contains fewer particulates of an electrophotographic imaging compound, thus producing a higher quality recycled paper product.

In one embodiment of the present invention, a system is provided for separating contrary matter from a working material. The system includes a processing element having a circular cross section that is adapted to receive the working material contaminated with the contrary matter. The processing element is also adapted to provide an egress for the working material and the separated contrary matter. Further, a number of transducers, such as strips of piezoelectric film, are attached to the outer surface of the processing element to construct a resonant chamber. The transducer elements are also coupled to an exciter that provides a steady state square wave excitation that causes the transducer elements to vibrate. The vibration of the transducer elements produces an energy field within the resonant chamber that impacts the working material contaminated with the contrary matter. The impact of the energy field on the working material, within the processing element, causes the contrary matter to separate from the working material.

The above described apparatus benefits the waste paper recycling industry in that dry toner, such as thermoplastic toner, can be separated from paper fibers in a paper slurry in a more efficient manner, as compared to conventional deinking techniques. For example, reduced costs are recognized in the pulping operation, because the water temperature required in the pulper can be reduced, chemical additives in the pulping operation are eliminated, and the pulping operation itself can have a reduced cycle time. Moreover, the system of the present invention may also increase revenues for a waste paper recycler because, the present invention causes mircofibrillation of the paper fibers in the paper slurry, which allows the waste paper recycler to produce a higher quality recycled paper product without additional energy input in the refiner stage.

In accordance with another aspect of the present of invention, a method is preformed in a resonant chamber for separating contrary matter from a working material. The working material may be of a lignocellulosic material, a biochemical compound, or the like. The working material is introduced into the circular cross section processing element where the separation of the contrary matter from the working material occurs. While the working material is within the processing element, the transducers coupled to the outer diameter of the processing element are excited with an excitation source to produce an energy field centrally disposed within the processing element itself. Separation of the contrary matter from the working material occurs when the contaminated working material comes into contact with the centrally disposed energy field. The effectivity of the separation process is dependent upon the amount of applied energy the working material is subjected to within the processing element. After passing through the energy field, the working material will exit the processing element where the separated contrary matter and the working material are sorted.

The above described approach benefits other types of working material that can be suspended in a liquid medium, including a liquefied working material. In this manner, a working material contaminated with contrary matter can be suspended in a liquid medium and subjected to an ultrasonic energy field to separate contrary matter. The application of the ultrasonic energy field to the liquid medium causes the contrary matter and the working material to separate from one another and further causes fusion of the separated contrary matter, which facilitates removal of the separated contrary matter.

To accommodate a variety of working materials, the processing element diameter may be altered to suit the size and type of contaminated working material. Further, several processing elements of differing internal diameter may be serially connected so that the liquid medium holding the working material is subjected to various energy fields. In this manner, a working material contaminated with multiple types of contrary matter may be processed in a single closed loop system. Moreover, the method is environmentally friendly in that the addition of a chemical catalyst is not necessary.

In accordance with another aspect of the present invention, an electronic driver is provided that is suitable for use with the transducer assembly to generate the ultrasonic energy field within the processing element. The electronic driver circuit utilizes isolatable power sources to drive the output stage that generates a clock-like output signal. The clock-like output signal is fed into a serial resonant circuit that is made up of a torodial shaped inductor and the transducer elements. The isolatable power sources of the electronic driver circuit may be of the DC to DC regulator type or may be of the AC to DC converter type.

BRIEF DESCRIPTION OF THE DRAWINGS

The forgoing and other objects, features and advantages of the invention will be apparent from the following description and apparent from the accompanying drawings, in which like reference characters referred to the same parts throughout the different views. The drawings illustrate principles of the invention and, although not to scale, show relative dimensions.

DETAILED DESCRIPTION OF ILLUSTRATIVE EMBODIMENT

The present invention is directed to a resonant chamber that produces an inwardly radiated acoustic wave to cause the separation of contrary matter from a working material located within an inner passage of the resonant chamber. Specifically, the present invention is directed to a system and method for exciting a series of transducers coupled to a structure having a circular cross-section that forms a resonant chamber. The series of transducers cause the structure to vibrate which produces a transverse acoustic wave internal to the structure. The acoustic wave is concentrated in the passage to form a concentrated field. The exposure of the working material to the transverse acoustic wave causes the contrary matter and the working material to separate. Moreover the transverse acoustic wave further causes the fusion of the separated contrary matter.

In the illustrative embodiment of the present invention, the system for separating contrary matter from a working material is attractive to waste paper recyclers since the system helps to produce a cleaner, higher quality recycled paper product. The system can increase a waste paper recycler's revenue by reducing or eliminating the use of waste paper chemical additives associated with the pulping process, and by reducing the water temperature currently utilized in the waste paper pulping process when the waste paper is contaminated with an electrophotographic imaging compound.

The illustrative embodiment of the present invention is also attractive to biochemical and chemical researchers and manufacturers in performing an aggregation process on particulates suspended in an aqueous solution. For example, the agglutination of particles via cross bridging molecules as occurs in immuno-agglutination assays where cross bridging is via antibody molecules.

Figure 1:
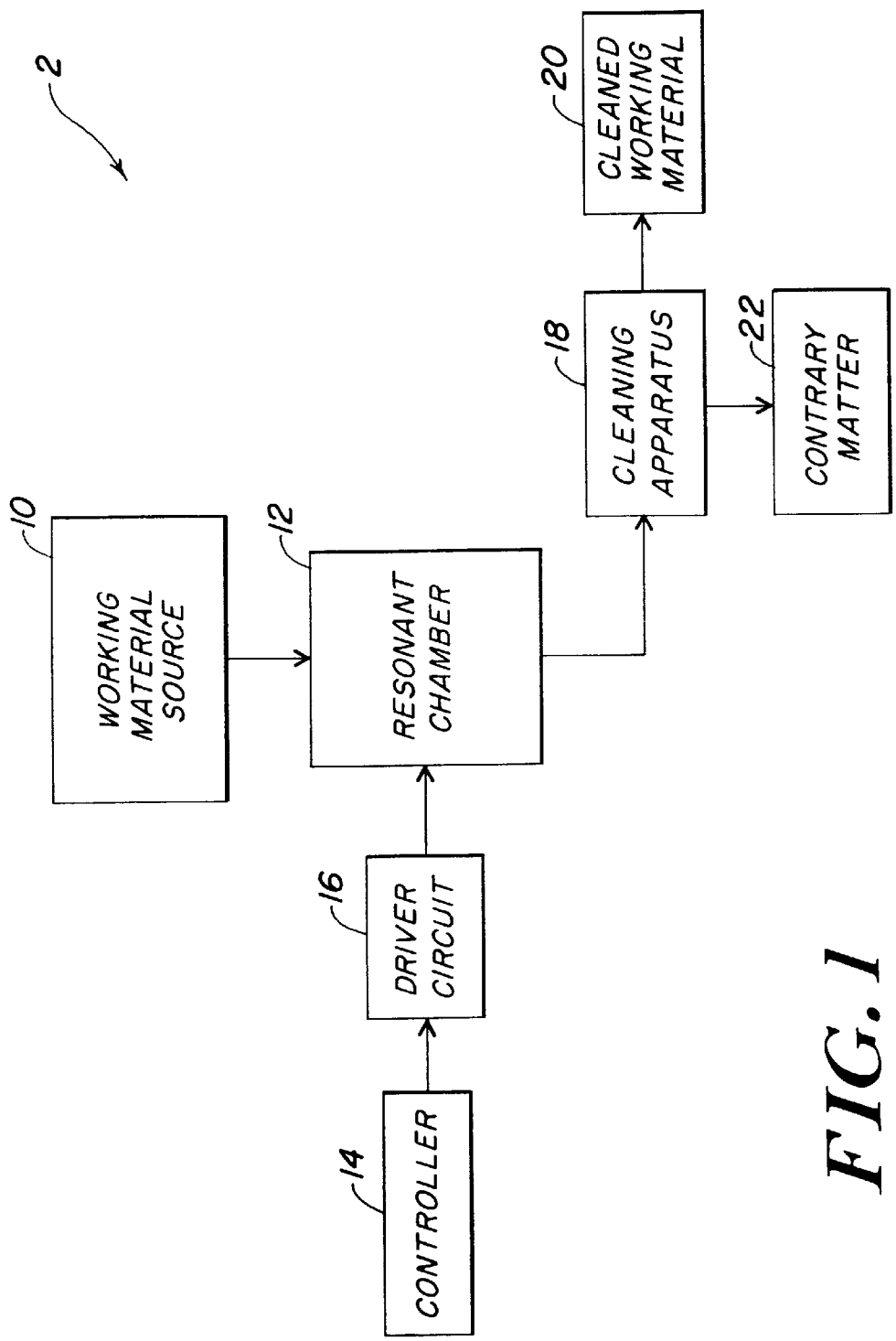
FIG. 1 is a schematic block diagram of a system configured for separating contrary matter from a working material in accordance with the teachings of the present invention.

FIG. 1 illustrates a system suitable for separating contrary matter from a working material. The illustrated separation system 2 provides a working material source 10 that is in fluid communication with a first portion of a resonant chamber 12 and a cleaning apparatus 18 that is in fluid communication with a second portion of the resonant chamber 12. The working material source 10 may be a holding tank, container, conduit, an apparatus such as a paper pulping apparatus, or any suitable device or structure for supplying resonant chamber 12 with a working material contaminated with a contrary matter. Cleaning apparatus 18 may be any suitable structure, such as a flotation cell or a washer that is able to cleanse the liquid medium of the separated contrary matter.

One skilled in the art will recognize that a flow control device may be coupled between the working material source 10 and the resonant chamber 12 without departing from the scope of the present invention. Typical flow control devices may include a variety of valves, baffles, bushings, couplings, restrictors, screens or any other suitable device or structure for use in controlling or limiting the flow of a liquid medium. In like manner, the egress of resonant chamber 12 may also be adapted with a flow control device suitable for use in controlling the flow of the working material through resonant chamber 12. The flow control devices may be used to control working material volume within the resonant chamber 12 and in like manner, may be use to control the resonance period or duration of the working material within resonant chamber 12.

The illustrated cleaning apparatus 18 receives a liquid medium from the resonant chamber 12 that contains particulates of contrary matter that have been separated from the working material by the resonant chamber 12. As shown in FIG. 1, the cleaning apparatus 18 cleanses the liquid medium from resonant chamber 12 by directing the working material to storage device 20, and by directing the separated particulates of contrary matter to storage device 22. One skilled in the art will appreciate that an additional cleansing apparatus may be substituted for storage device 20. The contrary matter separated by the resonant chamber 12 and directed by cleaning apparatus 18 into a storage device 22 may be later disposed, or sent for additional processing in order to recover the particulates for re-use, or the like.

In operation, the resonant chamber 12 generates a transverse acoustic wave field within its inner passage. Resonant chamber 12 will be discussed in further detail below. Driver circuit 16 in electrical communication with resonant chamber 12 excites the transducer elements of resonant chamber 12 to generate the beneficial transverse energy field. Driver circuit 16, which will be discussed in more detail below, produces a time based output waveform. Controller 14 provides driver circuit 16 with a stable clock signal to synchronize the time based output waveform of driver circuit 16.

The time based output waveform of the driver circuit 16 is a square wave having a positive voltage component and a negative voltage component. The positive voltage component and the negative component of the square wave being equal in terms of duration and magnitude. The clock-like output waveform of the driver circuit 16 allows the transducer elements of the resonant chamber 12 to produce the maximum amount of movement, and thus the advantageous benefit of generating the maximum amount of inwardly focused energy to produce an ultrasonic transverse wave 30 within the inner passage of resonant chamber 12. This energy can be concentrated in the central portion of the passage by the resonant chamber 12.

The application of the ultrasonic transverse wave 30 to the working material flowing through the inner passage of the resonant chamber 12 separates the contrary matter from the working material and also causes the separated contrary matter to fuse. One skilled in the art will appreciate that the separation system 2 may accommodate two or more resonant chambers 12 arranged in parallel between the working material source 10 and the cleaning apparatus 18. Additionally, one skilled in the art will appreciate that the resonant chamber 12 may be serially connected to one or more resonant chambers 12 that have the same or different internal diameter. Further, one skilled in the art will recognize that resonant chamber 12 may be specifically sized and adapted to target the separation of a particular type of contrary matter from a particular type of working material.

Figure 2:
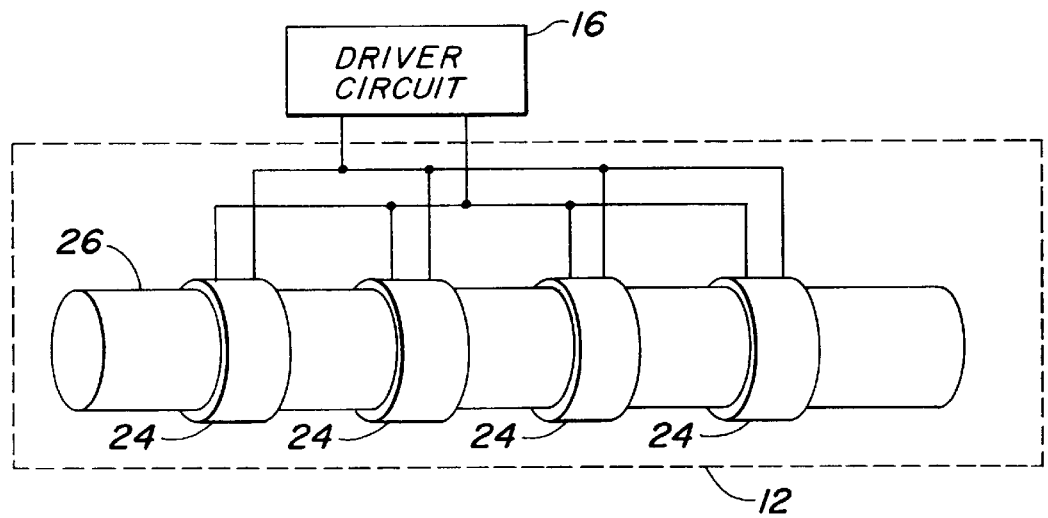
FIG. 2 is a more detailed schematic block diagram showing the transducers in circuit with the excitation source and adapted to be in contact with the outer wall of the processing element in accordance with the teachings of the present invention.

FIG. 2 illustrates the resonant chamber 12 in more detail. The resonant chamber 12 includes a processing element 26 that has a circular cross-section where the resonant chamber 12 is activated by a single phase driver. The processing element 26 may be a structure having a circular cross section that is adapted to allow the passage of the working material. Coupled to the outer surface of the processing element 26 are transducer elements 24 that convert the electrical excitation from the driver circuit 16 into a vibrational force to generate an ultrasonic transverse wave 30, FIG. 4, in the inner passage of resonant chamber 12.

In a preferred embodiment, the transducer elements 24 are piezoelectric elements manufactured from a piezoelectric film. Nevertheless, one skilled in the art will recognize that transducer elements 24 may also be selected from the family of magnetic transducers, magnetoconstrictive transducers, piezoelectric transducers, piezoelectric coatings or any combination thereof. In more detail, the piezoelectric film of the preferred embodiment is a polyvinylidene fluoride (PVDF) film sold under the trade name Kynar®. Kynar® PVDF film is manufactured by the Measurement Specialties, Incorporated of Fairfield, N.J. In addition, the metallized outer layers of the piezoelectric film are a screen-printed silver metallization provided by Measurement Specialties, Incorporated of Fairfield, N.J.

In operation, the metallized piezoelectric film forms a capacitor having a capacitance value that varies with temperature. Consequently, the Kynar® metallized piezoelectric film has a positive temperature coefficient of change in its capacitance value. As such, the inductor 114 is selected or adjusted to attain the proper series resonance for the resonant drive circuit 40 and the resonant drive circuit 42 when the resonant chamber 12 reaches its operating temperature. The operating temperature of the resonant chamber 12 is a function of the operating frequency of the drive signal that excites the transducer element 24 and the temperature of the liquid medium carrying the working material. To maintain reasonable power efficiency during operation, the processing temperature of the resonant chamber 12 should be maintained between about plus (+) five degrees Celsius and between about minus (−) five degrees Celsius.

The use of piezoelectric film provides the benefit of being lightweight, pliant, flexible, and, as a result, more easily formed around the processing element 26 than hard ceramic piezoelectric crystals or magnetorestrictive transducers. Piezoelectric film avoids conventional problems associated with mounting a rigid piezoelectric ceramic transducers on a curved surface, such as having to add a protrusion into the processing element 26 that may interfere with the flow of the working material suspended in the liquid medium.

In general, the processing element 26 is a rigid structure capable of transmitting energy. Material suitable for the construction of the processing element 26 include stainless steel, titanium, rigid composite compounds, ceramic compounds, and the like. The minimum internal diameter of the processing element 26 is sized in accordance with the type of working material in order to avoid possible clogging and jamming of the working material within the processing element 26.

In the preferred embodiment, the piezoelectric film that forms transducer elements 24 are sandwiched between a first outer conductor layer and a second outer conductor layer. The outer conductor layers of the piezoelectric film form the surface electrodes for receiving the excitation signal from driver circuit 16. Typically, the first outer conductive layer and the second outer conductive layer are formed using a silver loaded conductive epoxy that may be silk screened onto the piezoelectric film in order to control outer layer thickness. Alternatively, the outer conductive layers may be formed on the piezoelectric film using a vapor deposition technique. To avoid the possibility of arcing between adjacent transducer elements, the first outer conductor layer and the second outer conductor layer have an outside perimeter that is less than the perimeter of the piezoelectric film.

To establish the proper width of the piezoelectric film, the width of the first outer conductive layer and the width of the second outer conductive layer are approximately equal to or less than the inner circumference of the processing element 26. The resonant wavelength of the processing element 26 is a function of its internal diameter and can be calculated using the formula $(\pi)(D_i)(\sqrt{2})$ wherein $D_i$ is the internal diameter of the processing element 26. Those skilled in the art will recognize that the resonant wavelength of the processing element 26 may be a longitudinal resonant wavelength or a quasi-longitudinal resonant wavelength. The spacing between multiple transducer elements 24 along the outer diameter of the processing element 26 is approximately equal to the internal circumference of the processing element 26. One skilled in the art will recognize that the resonance frequency of the processing element 26 is dependent on the propagation of sound through the material forming the structure of circular cross sectional area of the processing element 26 when measured along the resonant wavelength.

Figure 2A:
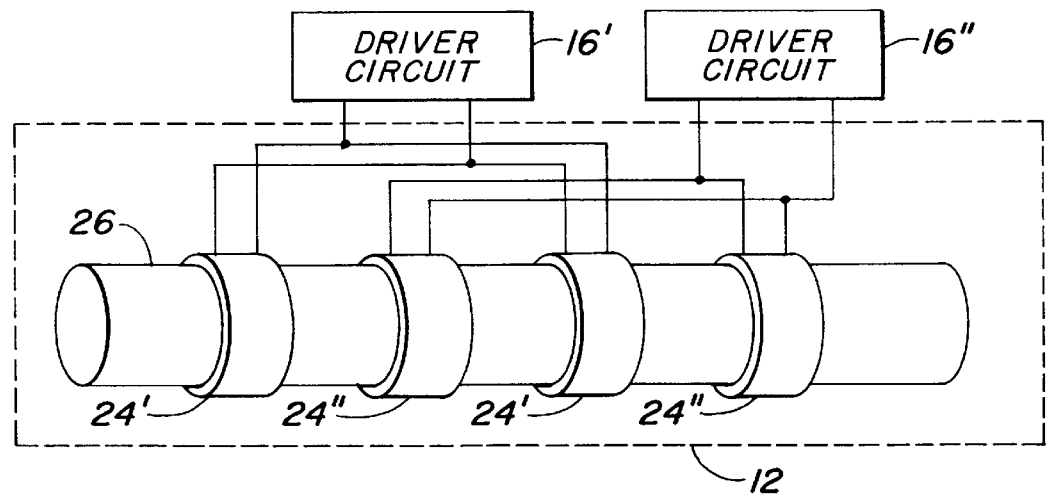
FIG. 2A is a more detailed schematic block diagram showing a first set of transducers in circuit with a first excitation source and a second set of transducers in circuit with a second excitation source that are adapted to be in contact with the outer wall of the processing element in accordance with the teachings of the present invention.

In one embodiment of the present invention, the resonant chamber 12 is formed using two sets of transducer elements 24. In this embodiment, the width of the first outer conductive layer and the width of the second outer conductive layer of the transducer elements 24 are approximately equal to or less than one half of the inner circumference of the processing element 26. The two sets of transducer elements 24 are excited by a two phase driver as depicted in FIG. 2A. The first set of transducer elements 24' are spaced along the outer surface of processing element 26 at a distance that is approximately equal to the internal circumference of processing element 26. The second set of transducer elements 24" are then interleaved between the first set of transducer elements 24'. In this manner, a transducer element 24 is in contact with the outer surface of processing element 26 at approximately every half longitudinal resonant wavelength of processing element 26. To take advantage of the half wavelength spacing of the transducer elements, each set of transducer element 24' and 24" are driven 180° out of phase from each other. The transducer element segmentation can be adjusted to accommodate quarter wavelength segmentation, eighth wavelength segmentation, or any other segmentation by resizing the transducer and increasing the number of transducers and drivers. For example, to drive the elements for quarter wavelength segmentation four drivers are required, and to drive the elements in an eighth wavelength segmentation eight drivers are required.

Figure 6:
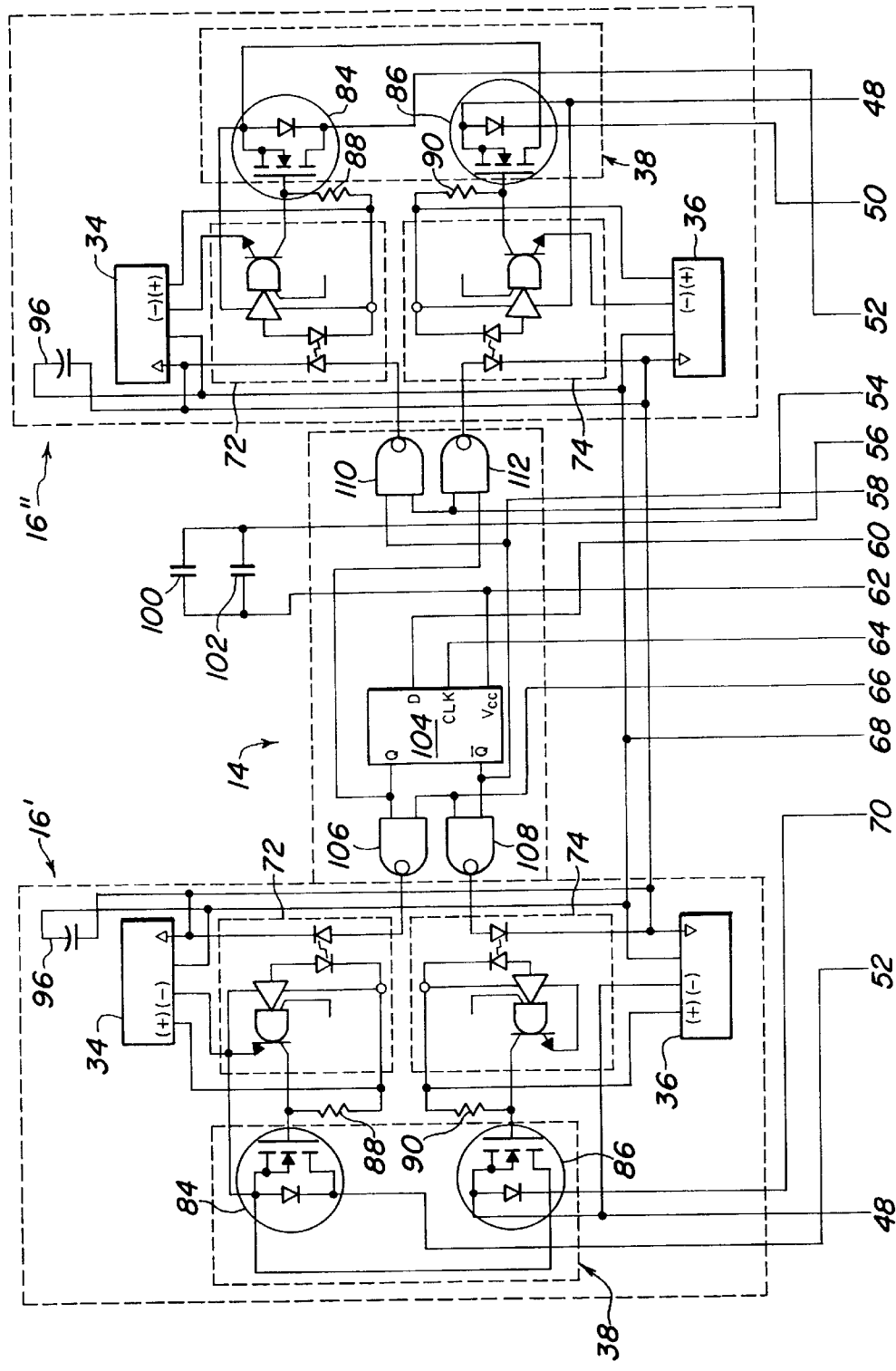
FIG. 6 is a schematic diagram illustrating two driver circuits in more detail.

To drive the first set of transducer elements 24' 180° out of phase from the second set of transducer elements 24", two driver circuits are utilized, as depicted by FIG. 6, including driver circuit 16' and driver circuit 16". To ensure that the first set of transducer elements 24' and the second set of transducer elements 24" are 180° out of phase, controller 14 supplies driver circuit 16' with a clock signal that is 180° out of phase from the clock signal supplied to driver circuit 16".

The use of two sets or multiple sets of four, eight, or the like, of transducer elements advantageously provides the benefit of minimizing the adverse effects of longitudinal wave cancellation within processing element 26 that can cause a reduction in the ultrasonic transverse wave 30 through the liquid medium, or caused by transducer elements operating in opposition. As a result, the power density of the energy field within processing element 26 may be increased or varied through the addition or subtraction of transducer elements, and by timing the phase relationship of the first set of transducer elements 24' and the second set of transducer elements 24". Consequently, the configuration of the transducer elements along the processing element 26 forms a regenerative phased array that optimizes the energy utilized to separate contrary matter from the working material. The phased array is considered regenerative because each transducer element in the array is able to recover and reuse the longitudinal energy that is stored in the processing element 26, by the other transducer elements in the array.

Figure 3:
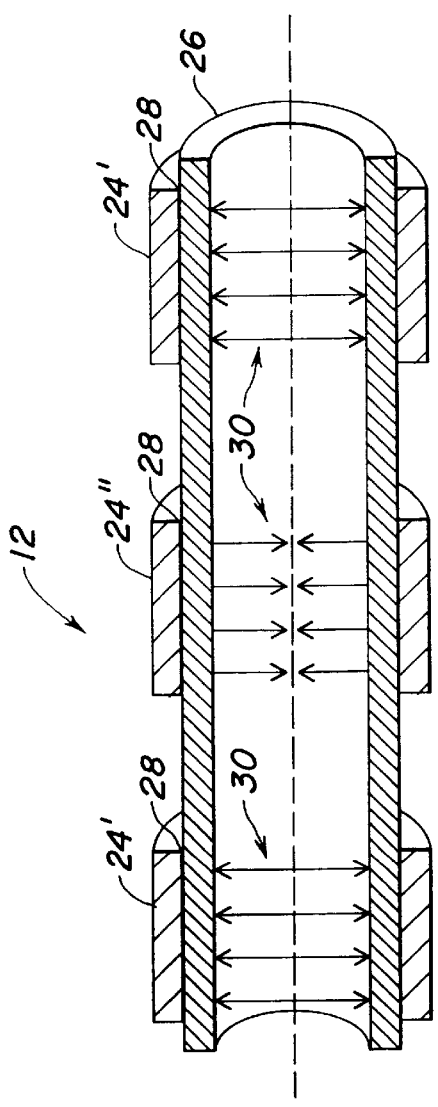
FIG. 3 is an exemplary cross section of the processing element illustrating the energy field formed within the processing element according to the teaching of the present invention.

The longitudinal cross section of the processing element 26, as shown in FIG. 3, illustrates the ultrasonic transverse wave 30 produced in the resonant chamber 12. The ultrasonic transverse wave 30 is centrally disposed about the longitudinal axis of the processing element 26. Transducer elements 24 introduce acoustic energy into the liquid medium, which carries the working material, through the physical contraction and expansion of the transducer elements. The ultrasonic transverse wave 30 is created within the process element as a result of these near simultaneous contractions and expansions. The spacing between the transducer elements 24 is such that they tend to reinforce and amplify ultrasonic transverse wave 30 as is generated along the longitudinal length of the processing element 26.

The transducer element 24 may be attached to the outer surface of processing element 26 using any suitable adhesive 28. In the preferred embodiment of the invention, the adhesive 28 is a two part polyester adhesive. To add additional transducer mounting security, an insulating material may cover the exposed outer surface conductive layer of transducer element 24.

Figure 4:
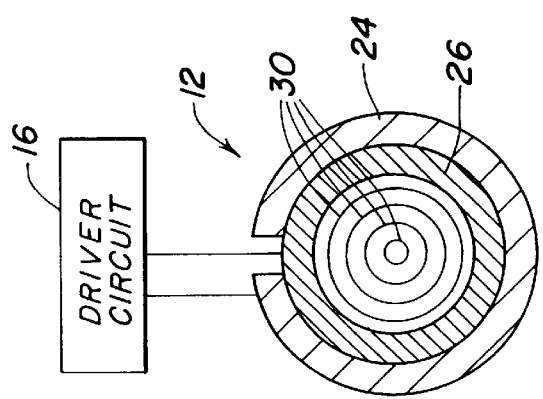
FIG. 4 is an exemplary end view of the processing element illustrating the distribution of the energy field within the processing element along a central longitudinal axis according to the teaching of the present invention.

As illustrated in FIG. 4, the circumferential length of the transducer element 24 is approximately equal to the inside diameter of the processing element 26. Having the length of transducer element 24 being approximately equal to the outside diameter of processing element 26 advantageously focuses ultrasonic transverse wave 30 along a central longitudinal axis of the processing element 26. The focusing of ultrasonic transverse wave 30 along a central axis produces a predictable transverse acoustic wave or energy field within the processing element for separating contrary matter from the working material. One skilled in the art will recognize that the energy field produced within the processing element 26 is a function of the velocity of sound through the rigid material forming the structure of the processing element 26, the internal diameter of the processing element 26, the longitudinal resonant wavelength of the processing element 26, and the excitation frequency of the transducer element 24.

Figure 5:
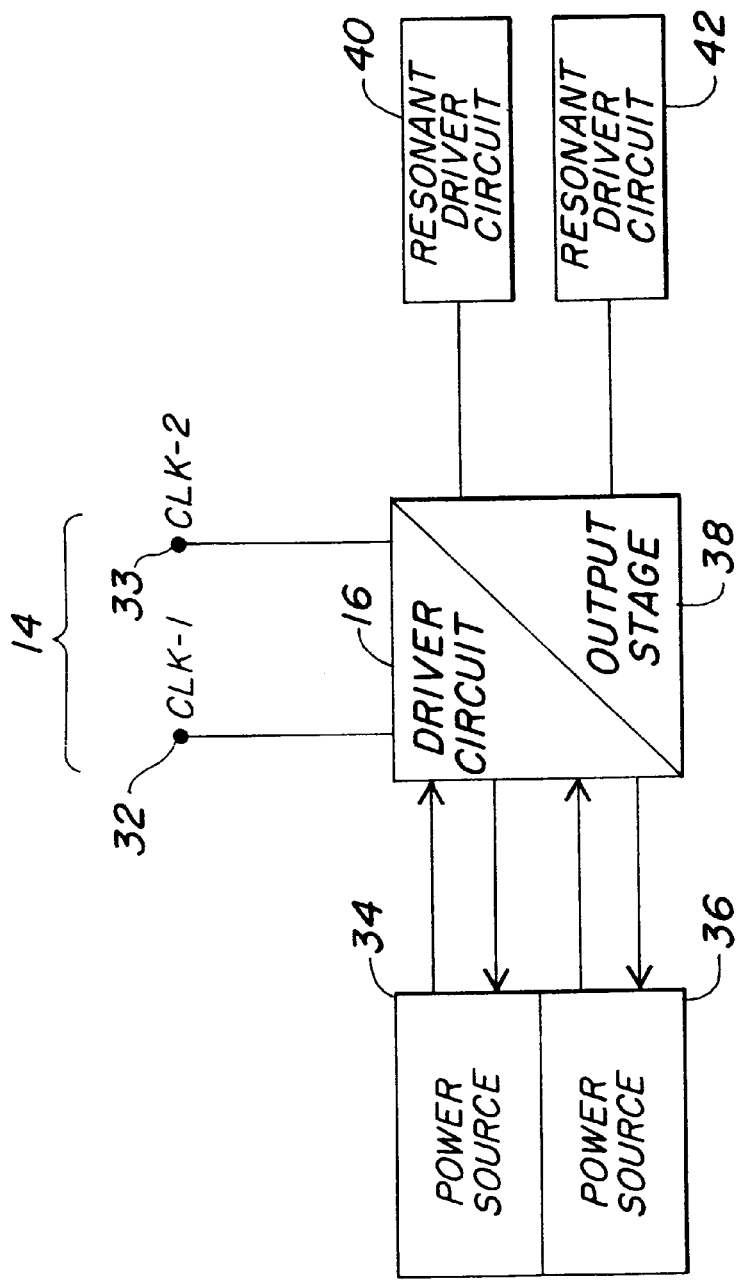
FIG. 5 is a schematic block diagram illustrating a driver circuit suitable for driving the transducer elements in accordance with the teachings of the present invention.

FIG. 5 is an illustrative block diagram of the driver circuit 16 that provides transducer elements 24 with the necessary time based voltage signal to produce ultrasonic transverse wave 30. The driver circuit 16 is synchronized by controller 14 that supplies a first stable clock signal at input node 32 and a second stable clock signal at input node 33. A first isolatable power source 34 and a second isolatable power source 36 provide the necessary drive to control output stage 38. The output stage 38, which will be discussed in more detail below, is a push-pull transistor configuration that generates complimentary square waves to drive resonant circuit 40 or resonant circuit 42. The drivers of output stage 38 operate in a switched mode to provide the benefit of reduced power dissipation similar to zero voltage switching.

Output stage 38 drives a first series resonant circuit 40 with a first output waveform or drives a second series resonant circuit 42 with a second output waveform that is the compliment of the first output waveform. Series resonant circuit 40 and 42 include a torodial inductor in series with one or more of the transducer elements 24. Transducer elements 24 forms the capacative element in series resonant circuit 40 and 42.

FIG. 6 depicts driver circuit 16 and the output stage 38 in more detail. As depicted, controller 14 is able to synchronize the operation of two or more driver circuits. One skilled in the art will recognize that controller 14 may be adapted to control a single driver circuit 16. For ease of discussion the two driver circuits depicted in FIG. 6 will be referred to below as 16' and 16". Driver circuit 16' and 16" are identical in function and utilize like components throughout.

As illustrated, driver circuit 16' provides a complimentary clock like excitation signal to resonant circuit 40 at output node 70 and in similar fashion, driver 16" provides a complimentary clock like excitation signal to resonant circuit 42 at output node 50. The controller 14 synchronizes the triggering of each output stage 38 so that the output waveforms on the output node 50 and the output node 70 are equal in duration and magnitude, but opposite in amplitude. The result of the synchronization is that a first set of transducer elements 24' can be excited with an excitation signal that is 180° out of phase from an excitation signal for a second set of transducer elements 24". The phased relationship of the excitation signals provides the benefit of establishing a transverse wave within resonant chamber 12 that increases in power density due to the timed reinforcement of energy by the transducer elements 24.

The controller circuit 14 utilizes flip flop 104 to generate a clock signal that triggers the output stage 38 of driver circuit 16' and 16" to produce the complimentary clock like output waveform. Input voltage node 62 provides the flip-flop 104 with the voltage necessary to operate. The capacitors 100 and 102 provide the necessary DC block between voltage node 62 and ground node 56. The input node 64 provides flip-flop 104 with the clock signal necessary to clock the data from input 60 through flip-flop 104. The input node 60 provides flip flop 104 with the necessary clock-like input data that is asserted at a first input of NAND gate 106, to a first input of NAND gate 108, to a first input of NAND gate 110, and to a first input of NAND gate 112. Flip-flop 104 may be a 74LS74 style flip-flop.

The control circuit 14 is also provided with an inhibit signal to prevent the generation of an output waveform from driver circuit 16' and driver circuit 16". A first inhibit signal may be asserted at input node 54, which is in circuit with a second input of NAND gate 110 and a second input of NAND gate 112. In operation, when the inhibit signal at input node 54 is deasserted, output stage 38 generates the complimentary clock like output signal. A voltage level representative of a logic "1" level at input node 54 indicates that the inhibit signal is deasserted. Should the inhibit signal at input node 54 fall to a voltage level representative of a logic "0" level, NAND gate 110 and 112 both assert a logic "1" output which, prevents output circuit 38 from asserting the complimentary clock like output waveform at driver circuit 16". In like manner, input node 66 is in circuit with a second input of NAND gate 106 and a second input of NAND gate 108 to provide an inhibit signal for use in preventing the output stage 38 of driver 16' from asserting the complimentary clock like output waveform.

Input node 68 is coupled to the voltage in node of isolatable power supply 34 and the voltage in node of isolatable power supply 36 to supply the necessary voltage signal input for their operation. Power supply 34 and 36 may be selected from the NME series of DC—DC converters manufactured by Newport Components Incorporated of Raleigh, N.C. Capacitor 96 is coupled between input voltage node 68 and ground node 56 to provide the necessary DC block between the voltage input of power supply 34 and 36 and their associated ground node.

Power supply 34 and 36 operate to provide the necessary voltage signal to operate optocoupler 72 and optocoupler 74. Optocouplers 72 and 74 are manufactured by QT Opto Electronics, of Sunny Vale, Calif. under the part number 6N137. In operation, power supply 34 and 36 each supply optocoupler 72 and 74 with the necessary 5-volt operating signal. The output of optocoupler 72 is in circuit with the gate of MOSFET 84 and the output of optocoupler 74 is in circuit with the gate of MOSFET 86 in the drive circuit 16". In this fashion, optocoupler 72 and 74 act as switches to turn MOSFET 84 and 86 ON and OFF in accordance with the output logic signal asserted by the NAND gates of controller 14. The output of NAND gate 106 is coupled to the input of optocoupler 72 in drive circuit 16', while the output of NAND gate 108 is coupled to the input of optocoupler 74 in drive circuit 16'. Similarly, the output of NAND gate 110 is coupled to the input of optocoupler 72 in drive circuit 16", and the output of NAND gate 112 is coupled to the input of optocoupler 74 in drive circuit 16".

Resistor 88 is coupled between the gate of MOSFET 84 and the power supply node 34 that supplies the operating voltage signal to optocoupler 72. In like manner, resistor 90 is tied between the gate of MOSFET 86 and the power supply node 36 that supplies the operating voltage signal to optocoupler 74. Resistor 88 and 90 provide a resistive load to the output node of optocoupler 72 and 74 respectively.

In operation, when NAND gate 106 asserts a logic "1" level to the input of optocoupler 72, the input voltage level at the gate of MOSFET 84 is driven to a logic "0" level to turn OFF MOSFET 84. While NAND gate 106 is asserting a logic "1" level signal to the input of optocoupler 72, NAND gate 108 is asserting a logic "0" level to input of optocoupler 74. The assertion of the logic "0" level by NAND gate 108 to the input of optocoupler 74 turns ON the gate of MOSFET 86, and thus allows MOSFET 86 to assert the negative component of the output waveform at output node 70.

On the next input data transition at input node 60, the outputs of flip flop 104 transition to opposite states and as a result, NAND gate 106 asserts a logic "0" level and NAND gate 108 asserts a logic "1" level. The change in the output state of NAND gate 106, results in the assertion of a logic "0" level to the input of optocoupler 72, which turns ON the gate of MOSFET 84 and allows assertion of the positive component of the output waveform on output node 70 in driver circuit 16'. Further, the change in the output state of NAND gate 108 to the assertion of a logic "1" level, triggers optocoupler 74 to turn OFF the gate of MOSFET 86, hence removing the negative component of the output waveform from output node 70. Driver circuit 16' is in circuit with the output node 70 to provide a clock like voltage waveform to the resonant circuit 40.

In like manner, the output states of NAND gate 110 and NAND gate 112 transition in like fashion to NAND gates 106 and 108. The output states of NAND gates 110 and 112 function to control the operation of optocouplers 72 and 74 in driver circuit 16", which, in turn, assert the necessary logic signals to turn ON and OFF the gates of MOSFETs 84 and 86. The output of MOSFETs 84 and 86 in driver circuit 16" are in circuit with output node 50 to provide the complimentary clock like output voltage waveform to the resonant circuit 42.

Input node 52 is in circuit with the source of MOSFET 84 to supply a positive source voltage. Because of the isolatable power supplies, the positive and the negative source voltages of the MOSFET devices may have an operating range from about +/−5 volts DC to about +/−400 volts DC in order to adjust the power output of the driver 16. Typically the positive source voltage may be set to about plus 50 volts DC. Input node 48 is in circuit with the source of MOSFET 86 to supply the input voltage necessary to generate the negative component of the output waveform. Input node 48 may be set to approximately −50 volts DC. Those skilled in the art will recognize that the supply voltages applied to output amplifier 38 will determine the maximum power output obtainable from output amplifier 38, therefore the source voltages may be set to more than plus 50 volts DC and more than minus 50 volts DC. MOSFET 84 and 86 may be an INRF840 manufactured International Rectifier of El Sangundo, Calif.

Input node 60 combined with output node 58 are used to synchronize more than a single driver pair. Should an application utilize a single driver pair as illustrated in FIG. 6, then input node 60 and output node 58 are tied together. Should an application need to utilize a second driver pair, output node 58 of the first driver pair is utilized to control a second driver pair by connecting the output node 58 of the first driver pair to the input node 60 of the second driver pair. As such, the first driver pair is the master and the second driver pair is the slave. In the event that an application needs to utilize a third driver pair, the output node 58 of the first driver pair (master) synchronizes the first slave driver pair while the output node 58 of the first slave driver pair synchronizes a second slave driver pair.

Figure 7:
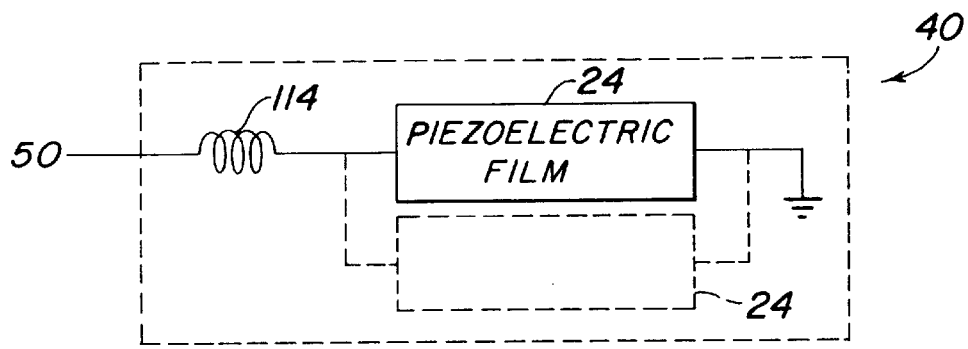
FIGS. 7 and 8 are schematic diagrams illustrating the resonant circuits of FIG. 5 in more detail.

FIG. 7 depicts output node 50 in circuit with toroidal inductor 114 and transducer element 24. Inductor 114 is in series with transducer element 24 to form series resonant circuit 40. Series resonant circuit 40 may be adapted to have two or more transducer elements 24 coupled in parallel, as indicated by the shadowed line. Transducer elements 24 have their outputs coupled to ground. Inductor 114 may be an A-109156-2 toroid core available from the Arnold Engineering Company of Marango, Ill.

Figure 8:
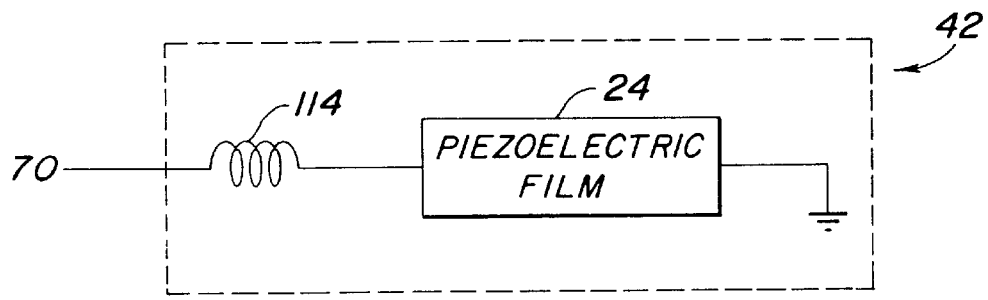

In similar fashion, FIG. 8 depicts series resonant circuit 42 that is adapted to be in circuit with output node 70. As depicted, output node 70 is in circuit with inductor element 114 and transducer element 24. One skilled in the art will recognize that output node 70 is also able to drive a series resonant circuit 42 having two or more transducer elements coupled in parallel.

Figure 9:
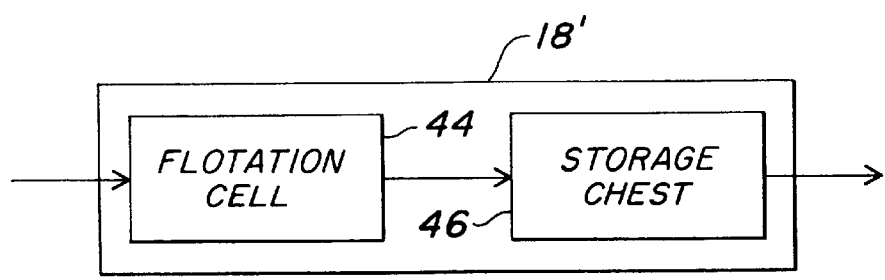
FIG. 9 is a schematic block diagram illustrating an exemplary cleaning operation for a lignocellulosic working material.

FIG. 9 depicts a preferred cleaning apparatus 18' that is utilized when the working material source 10 supplies resonant chamber 12 with a lignocellulosic working material. Cleaning apparatus 18' utilizes a floatation cell 44 in series with a storage chest 46 to cleanse the liquid medium of the undesirable contrary matter. Floatation cell 44 injects air bubbles into the liquid medium to produce a contrary matter enriched froath. Floatation cell 44 may be any commonly available commercial floatation cell. Floatation cell 44 passes the cleansed lignocellulosic material to storage chest 46 for storage until needed by an another operation in the waste paper recycling process. One skilled in the art will recognize that floatation cell 44 may be replaced by a washer and that additional processing operations, such as, a bleaching operation, or various screening operations, may be added or deleted as necessary.

While the present invention has been described with reference to the above illustrative embodiments, those skilled in the art will appreciate that various changes in form and detail may be made without departing from the intended scope of the present invention as defined in the appended claims.

What is claimed is:

1. A system for separating contrary matter from a working material, comprising:
   a processing element having a circular cross-section, an inner passage, and an outer wall, a first portion of the processing element being adapted to communicate with a working material source and a second portion of the processing element adapted to provide an egress for the working material; and
   a plurality of piezoelectric film transducers arranged and coupled to the outer wall of the processing element to form a regenerative phased array assembly for producing an energy field within the inner passage of the processing element, when activated, to cause the contrary matter to separate from the working material.

2. The system of claim 1, further comprising an exciter for exciting one or more of the plurality of transducers to generate the energy field within the inner passage of the processing element to separate the contrary matter from the working material.

3. The system of claim 1, wherein the energy field produced by the plurality of transducers within the inner passage of the processing element induces the working material to vibrate within the inner passage of the processing element to separate the contrary matter from the working material.

4. The system of claim 1, wherein the processing element and the plurality of piezoelectric film transducers together form a resonating structure.

5. The system of claim 1, wherein the energy field produced within the processing element by the plurality of transducers coupled to the outer wall of the processing element to cause the separation of the contrary matter from the working material is independent of the length of the processing element.

6. The system of claim 5, wherein an effectiveness of the separation of the contrary matter from the working material is dependent on an amount of applied energy the working material is subjected to within the inner passage of the processing element when its plurality of piezoelectric film transducers are excited.

7. The system of claim 1, wherein the contrary matter comprises one of an electrophotographic imaging compound, a protective coating, and a biochemical compound.

8. The system of claim 1, wherein the working material comprises one of a biochemical compound and a lignocellulosic material.

9. The system of claim 1, wherein the energy field produced within the processing element by the plurality of piezoelectric film transducers coupled to the outer wall of the processing element causes the separated contrary matter to fuse.

10. The system of claim 1, wherein the processing element comprises an elongated conduit.

11. The system of claim 10, wherein the elongated conduit has an internal diameter of at least one inch.

12. The system of claim 1, wherein the elongated conduit has an internal diameter correlating to a wavelength of the energy field produced within the processing element.

13. The system of claim 10, wherein the elongated conduit is composed of titanium or stainless steel.

14. The system of claim 1, wherein the processing element is a rigid structure capable of transmitting energy.

15. The system of claim 1, wherein one or more of the plurality of transducers further comprises a magnetic transducer, or a magnetoconstrictive transducer.

16. The system of claim 1, wherein at least one of the plurality of piezoelectric film transducers comprises at least one layer of a polyvinyldene fluoride (PVDF) film.

17. The system of claim 15, wherein a top surface and a bottom surface of the at least one of the plurality of piezoelectric film transducers are electrically conductive.

18. The system of claim 1, further comprising a driver circuit in communication with said plurality of transducers for exciting said transducers.

19. The system of claim 1, wherein the energy field generated by said plurality of transducers is disposed substantially about a longitudinal axis of the processing element.

20. The system of claim 1, wherein the energy field generated by said plurality of transducers is concentrated substantially within a central portion of the processing element.

21. The system of claim 4, wherein the working material is subjected to the energy field produced within the inner passage of the processing element by the plurality of transducers coupled to the outer wall of the processing element for between about 25 seconds and about 120 seconds.

22. The system of claim 1, wherein the energy field produced by the plurality of transducers within the inner passage of the processing element has a frequency of at least 20 kHz.

23. The system of claim 1, wherein the energy field produced by the plurality of transducers within the inner passage of the processing element has a wavelength that is related to the internal diameter of the processing element, and is determined according to $(\pi)(\sqrt{2})(D_i)$, wherein $D_i$ is the internal diameter of the processing element.

24. An apparatus for processing waste paper to cause a selected particulate to separate from a lignocellulosic material, comprising:
  a processing element having a longitudinal axis, a circular cross-section and an outer wall, said processing element having an inner diameter selected for accepting the lignocellulosic material; and
  a first set of transducer elements containing a plurality of piezoelectric elements coupled to the outer wall of the processing element and disposed along said longitudinal axis at a selected inter-element spacing for generating an energy field within the processing element, the energy field having a transverse waveform centrally disposed about the longitudinal axis of the processing element to cause the selected particulate to separate from the lignocellulosic material, wherein the selected inter-element spacing between sequential elements of like phase is about equal to an internal circumference of the processing element.

25. The apparatus of claim 24, wherein the energy field generated by the plurality of piezoelectric elements is disposed substantially about a longitudinal axis of the elongated processing conduit.

26. The apparatus of claim 25, wherein the energy field generated by said plurality of piezoelectric elements within the processing element is disposed substantially within a central portion of the processing element.

27. The apparatus of claim 25, wherein the lignocellulosic material is subjected to the energy field generated by the piezoelectric elements within the processing element for between about 25 seconds and about 120 seconds.

28. The apparatus of claim 24 wherein the piezoelectric elements comprise a piezoelectric film.

29. The apparatus of claim 25, wherein the piezoelectric film is at least one layer of polyvinyldene fluoride (PVDF) film.

30. The apparatus of claim 29, further comprising a driver circuit for driving the plurality of piezoelectric elements.

31. The apparatus of claim 30, wherein the first set of said plurality of piezoelectric elements are driven 180° out of phase from a second set of said plurality of piezoelectric elements for generating the energy field within the processing element to separate the contrary matter from the lignocellulosic material.

32. The apparatus of claim 25, wherein the selected particulate comprises electrophotographic imaging components.

33. The apparatus of claim 25, further comprising an exciter for exciting one or more of the plurality of piezoelectric elements to generate the energy field within the processing element to separate the selected particulate from the working material.

34. The apparatus of claim 25, wherein an effectiveness of the separation of the selected particulate from the lignocellulosic material by the energy field generated by the plurality of piezoelectric elements within the processing element is dependent upon an amount of applied energy the lignocellulosic material is subjected to within the processing element.

35. The apparatus of claim 24, wherein the energy field generated by the plurality of piezoelectric elements within the processing element fuses the separated selected particulates.

* * * * *